United States Patent
Matsui

(10) Patent No.: US 10,486,559 B2
(45) Date of Patent: Nov. 26, 2019

(54) VEHICLE SEAT

(71) Applicant: TOYOTA BOSHOKU KABUSHIKI KAISHA, Aichi (JP)

(72) Inventor: Hayato Matsui, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/966,670

(22) Filed: Apr. 30, 2018

(65) Prior Publication Data
US 2018/0339611 A1 Nov. 29, 2018

(30) Foreign Application Priority Data
May 23, 2017 (JP) ................................ 2017-101721

(51) Int. Cl.
| | | |
|---|---|---|
| *B60N 2/015* | (2006.01) | |
| *B60N 2/12* | (2006.01) | |
| *B60N 2/18* | (2006.01) | |
| *B60N 2/16* | (2006.01) | |

(52) U.S. Cl.
CPC .......... *B60N 2/1615* (2013.01); *B60N 2/015* (2013.01)

(58) Field of Classification Search
CPC .... B60N 2/1615; B60N 2/015; B60N 2/0732; B60N 2/682
USPC .... 297/344.15, 344.16, 344.17, 463.1, 463.2
See application file for complete search history.

(56) References Cited

U.S. PATENT DOCUMENTS

| | | | | |
|---|---|---|---|---|
| 4,556,185 A | * | 12/1985 | Takagi ................... | B60N 2/045 297/344.15 X |
| 9,834,116 B2 | * | 12/2017 | Couasnon ............ | B60N 2/0705 |
| 10,118,506 B2 | * | 11/2018 | Hattori ................. | B60N 2/0705 |
| 2007/0013223 A1 | * | 1/2007 | Gabalski ............... | B60N 2/682 297/463.1 |
| 2007/0216210 A1 | * | 9/2007 | Kim ..................... | B60N 2/1615 297/344.15 |
| 2015/0307006 A1 | * | 10/2015 | Hayashi ................. | B60R 22/26 297/344.13 |
| 2018/0009338 A1 | * | 1/2018 | Kim ....................... | B60N 2/165 |

FOREIGN PATENT DOCUMENTS

JP 2005028971 2/2005

\* cited by examiner

*Primary Examiner* — Rodney B White
(74) *Attorney, Agent, or Firm* — Greenblum & Bernstein, P.L.C.

(57) ABSTRACT

A vehicle seat is provided. The vehicle seat includes a cushion frame, a coupling bracket including a coupling portion and a flange portion, a lifter link, and a fixing member. The coupling portion includes a plate panel which, is substantially orthogonal to a fixing face of the fixing member, and substantially parallel to a seat front-rear direction. An end face of the plate material is welded to the fixing face. The flange portion protrudes in a seat width direction from one end in the seat front-rear direction of the coupling portion, includes a plate panel substantially orthogonal to the fixing face, and is integrally molded with the coupling portion.

7 Claims, 8 Drawing Sheets

VEHICLE SEAT

CROSS-REFERENCE TO RELATED APPLICATIONS

This application claims the benefit of Japanese Patent Application No. 2017-101721 filed on May 23, 2017 with the Japan Patent Office, the entire disclosure of which is incorporated herein by reference.

BACKGROUND

The present disclosure relates to a vehicle seat to be mounted on a vehicle.

A cushion frame of a vehicle seat is fixed to a vehicle side via a lifter link and a coupling bracket, as shown in Japanese Unexamined Patent Application Publication No. 2005-28971, for example. The lifter link is a member for vertically displacing the cushion frame.

The lifter link is swingably coupled to the cushion frame at an upper end thereof, and swingably coupled to the coupling bracket at a lower end thereof, so as to swing in a seat front-rear direction. The coupling bracket is fixed to a movable rail of a sliding device by arc welding or the like.

The sliding device is one example of a fixing member that fixes the vehicle seat to the vehicle. The sliding device fixes the vehicle seat to the vehicle in a manner such that the vehicle seat cars slide in the seat font-rear direction. Specifically, the sliding device comprises a fixed rail that is fixed to the vehicle, and a movable rail that can slide with respect to the fixed rail, and the like.

SUMMARY

The present disclosure discloses one example of a vehicle seat in which a coupling bracket is laser-welded to a fixing member.

The vehicle seat comprises a cushion frame, a coupling bracket, a lifter link and a fixing member. The cushion frame forms a frame of a cushion seat. The coupling bracket is disposed spaced downward from the cushion frame and comprises a plate material. The coupling bracket includes a coupling portion and a flange portion. The lifter link is configured to swing in a seat front-rear direction so as to vertically displace the cushion frame. The lifter link is swingably coupled to the cushion frame at an upper end thereof, and is swingably coupled to the coupling portion at a lower end thereof. The fixing member has a fixing face to which an end face of the coupling portion is welded. The fixing member is fixed, directly or indirectly, to the vehicle.

The coupling portion comprises a plate material that is substantially orthogonal to the fixing face and substantially parallel to the seat front-rear direction. An end face of the plate material is welded to the fixing face.

The flange portion protrudes in a seat width direction from one end in the seat front-rear direction of the coupling portion. The flange portion comprises a plate material substantially orthogonal to the fixing face. The flange portion is integrally molded with the coupling portion.

This enables the end face of the plate material, which forms the coupling portion, to be laser-welded to the fixing face of the fixing member. That is, the coupling portion comprising the plate material is laser-welded to the fixing face at the end face of the plate material.

Therefore, a weld length in the seat width direction of a welded portion between the coupling portion and the fixing face is equal to or smaller than a plate thickness dimension of the coupling portion. Thus, if a load in a direction parallel to the plate thickness direction, that is the load in the seat width direction, is applied to the coupling portion, it is possible that a large bending stress is generated in the welded portion.

However, since the flange portion protrudes in the seat width direction from one end in the seat front-rear direction of the coupling portion and is integrally molded with the coupling portion, the load in the seat width direction can be received by the flange portion.

Accordingly, even it a load in the seat width direction is applied, it is possible to inhibit a large bending stress from being generated in the welded portion. That is, even if the coupling bracket is laser-welded to the fixing member, sufficient weld strength cars be achieved.

The vehicle seat may be configured as follows.

It is desirable that a fin portion may be provided at a leading end in a protruding direction of the flange portion, the fin portion protruding in the seat front-rear direction, the fin portion may be integrally molded with the flange portion, and comprise a plate material substantially orthogonal to the fixing face, and an end face of the plate material may be welded to the fixing face. Specifically, the fin portion may protrude toward an opposite side of the coupling portion across the flange portion in the seat front-rear direction.

This allows the coupling bracket to be firmly welded to the fixing member, and laser light to be radiated from the same side. Thus, it is possible to improve laser welding performance.

Assume that the flange portion is a first flange portion and the fin portion is a first fin portion. Then, it is desirable that a second flange portion and a second fin portion may be provided at the other end in the seat front-rear direction of the coupling portion.

It is desirable that the second flange portion may comprise a plate material that protrudes in the seat width direction from the other end in the seat front-rear direction of the coupling portion and that is substantially orthogonal to the fixing face, and may be integrally molded with the coupling portion.

Further, it is desirable that the second fin portion may be integrally molded with the first flange portion, and may comprise a plate material substantially orthogonal to the fixing face, and an end face of the plate material may be welded to the fixing face. This enables the coupling bracket to be further firmly welded to the fixing member.

If the cushion frame is displaced in the seat width direction with respect to the coupling bracket, a load toward the cushion frame is likely to be generated in the coupling bracket.

Laser welding produces a "sink mark", which is depression on a plate surface, in a welded portion between the coupling bracket and the fixing face. When a "tensile (bending) stress" is applied to the "sink mark", cracks starting from the "sink mark" are likely to be generated.

However, if the cushion frame is displaced to the "sink mark" side with respect to the coupling bracket, a "tensile (bending) stress" is only slightly applied to the "sink mark". Accordingly, generation of cracks starting from the "sink mark" can be inhibited.

In this case, if a load toward the cushion frame is generated, a "compression (bending) stress" is applied to the "sink mark". Therefore, cracks starting from the "sink mark" are inhibited.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

"Embodiments" to be described below show some examples of the present disclosure. That is, features recited in the claims are not limited to specific configurations, structures, etc. shown in the following embodiments.

Arrows and the like representing directions are attached to each figure to make it easy to understand relationship between the figures. The present disclosure is not limited to the directions shown in each figure.

First Embodiment

1. Outline of Vehicle Seat

Figure 1:
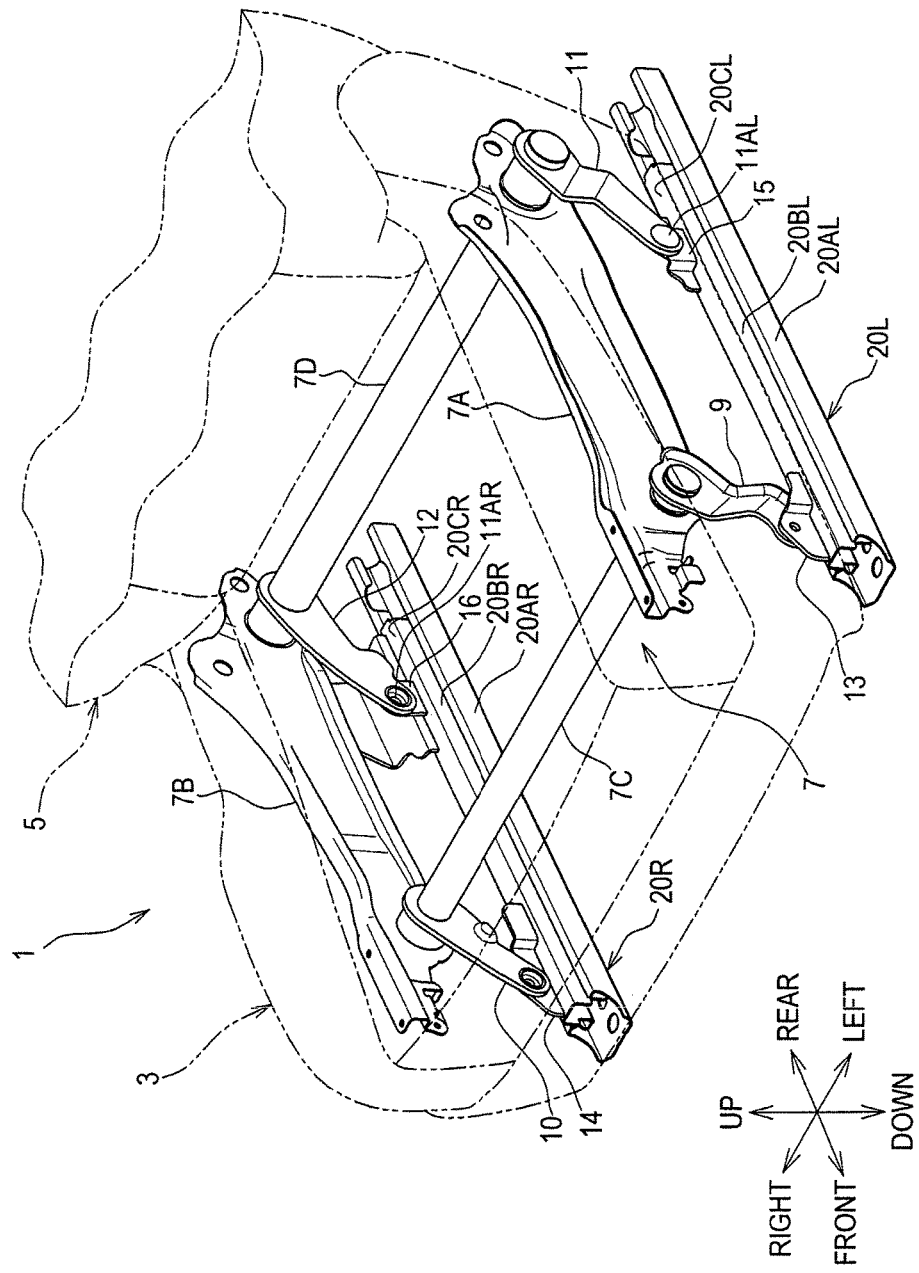
FIG. 1 is an explanatory view of a vehicle seat according to an embodiment.

A vehicle seat 1 of the present embodiment, as shown in FIG. 1, includes a seat cushion 3 and a seatback 5. The seat cushion 3 supports the bottoms of a seated person. The seatback 5 supports the back of the seated person.

A cushion frame 7 forms a frame of the seat cushion 3. The cushion frame 7 includes a left side frame 7A, a right side frame 7B, a first coupling rod 7C, and a second coupling rod 7D, The left side frame 7A is disposed on one end in a seat width direction (a left end of the seat in the present embodiment), and extends in a seat front-rear direction.

The right side frame 7B is disposed on the other end in the seat width direction (a right end of the seat in the present embodiment), and extends in the seat front-rear direction. The first coupling rod 7C and the second coupling rod 7D couple the left side frame 7A and the right side frame 7B.

The first coupling rod 7C extends in the seat width direction and couples a front end of the left side frame 7A and a front end of the right side frame 7B. The second coupling rod 7D extends in the seat width direction and couples a rear end of the left side frame 7A and a rear end of the right side frame 7B.

2. Support Structure of Cushion Frame 2.1 Outline of Support Structure

The cushion frame 7 is supported/fixed to a vehicle (through rails) via a plurality of lifter links 9 to 12 (a left front lifter link 9, a right front lifter link 10, a left rear lifter link 11, and a right rear lifter link 12) and a plurality of coupling brackets 13 to 16 (a left front coupling bracket 13, a right front coupling bracket 14, a left rear coupling bracket 15, and a right rear coupling bracket 16). The plurality of coupling brackets 13 to 16 are disposed spaced downward from the cushion frame 7, and couple the cushion frame 7 to the vehicle side such as a vehicle floor panel.

The plurality of coupling brackets 13 to 16 are fixed to the vehicle via two sliding devices 20L, 20R (a left sliding device 20L and a right sliding device 20R). The left sliding device 20L and the right sliding device 20R are one example of a fixing member for supporting/fixing the vehicle seat 1 to the vehicle.

The left sliding device 20L and the right sliding device 20R include a fixed rail 20AL, 20AR, and a movable rail 20BL, 20BR. The fixed rail 20AL, 20AR are fixed to the vehicle. The movable rail 20BL, 20BR can slide with respect to the fixed rail 20AL, 20AR. The left front coupling bracket 13 and the left rear coupling bracket 15 are fixed to the movable rail 20BL of the left sliding device 20L.

The right front coupling bracket 14 and the right rear coupling bracket 16 are fixed to the movable rail 20BR of the right sliding device 20R. An upper end of each of the lifter links 9 to 12 is swingably coupled to the cushion frame 7. A lower end of each of the lifter links 9 to 12 is swingably coupled to the corresponding one of the coupling brackets 13 to 16.

Specifically, the upper ends of the left front lifter link 9 and the left rear lifter link 10 are fixed to a first coupling rod 7C by a specified fixing manner such as welding. The first coupling rod 7C is rotatably coupled to the left side frame 7A and the right side frame 7R.

A lower end of the left front lifter link 9 is swingably coupled to the left front coupling bracket 13 via a coupling pin (not shown). A lower end of the right front lifter link 10 is swingably coupled to the right front coupling bracket 14 via a coupling pin (not shown).

Upper ends of the left rear lifter link 11 and the right rear lifter link 12 are fixed to a second coupling rod 7D by welding or the like. The second coupling rod 7D is rotatably coupled to the left side frame 7A and the right side frame 7B.

A lower end of the left rear lifter link 11 is swingably assembled to the left rear coupling bracket 15 via a left rear coupling pin 11AL. A lower end of the right rear lifter link 12 is swingably assembled to the right rear coupling bracket 16 via a right rear coupling pin 11AR.

The coupling pins 11AL, 11AR, similar to the first coupling rod 7C and the second coupling rod 7D, are rotationally symmetric with respect to a center axis parallel to the seat width direction. Thus, each of the lifter links 9 to 12 swings in the seat front-rear direction with respect to the center axis in the seat width direction.

Each of the lifter links 9 to 12 is manually operated or driven to swing by an actuator such as an electric motor. When each of the lifter links 9 to 12 swings, the cushion frame 7 is vertically displaced accordingly.

2.2 Weld Structure of Coupling Bracket and Sliding Device

<Outline of Weld Structure>

Each of the coupling brackets 13 to 16 comprises a plate material such as a cold rolled steel plate, and a lower end face thereof is laser-welded to the movable rail 20BL, 20BR.

Each of the coupling brackets 13 to 16 is molded into a specified shape by press molding. An end face of each of the coupling brackets 13 to 16 corresponds to a section plane produced by punching a plate material by a press machine.

The respective coupling brackets 13 to 16 are laser-welded to the movable rails 20BL, 20R with their tower end faces in contact with upper faces 20CL, 20CR of the movable rails 20BL, 20BR. That is, the upper faces 20CL, 20CR of the movable rails 20BL, 20BR correspond to fixing faces to which the respective coupling brackets 13 to 16 are welded. The upper faces 20CL, 20CR of the movable rail 20BL, 20BR can be also understood as fixing faces 20CL, 20CR.

<Details of Weld Structure>

Figure 2:
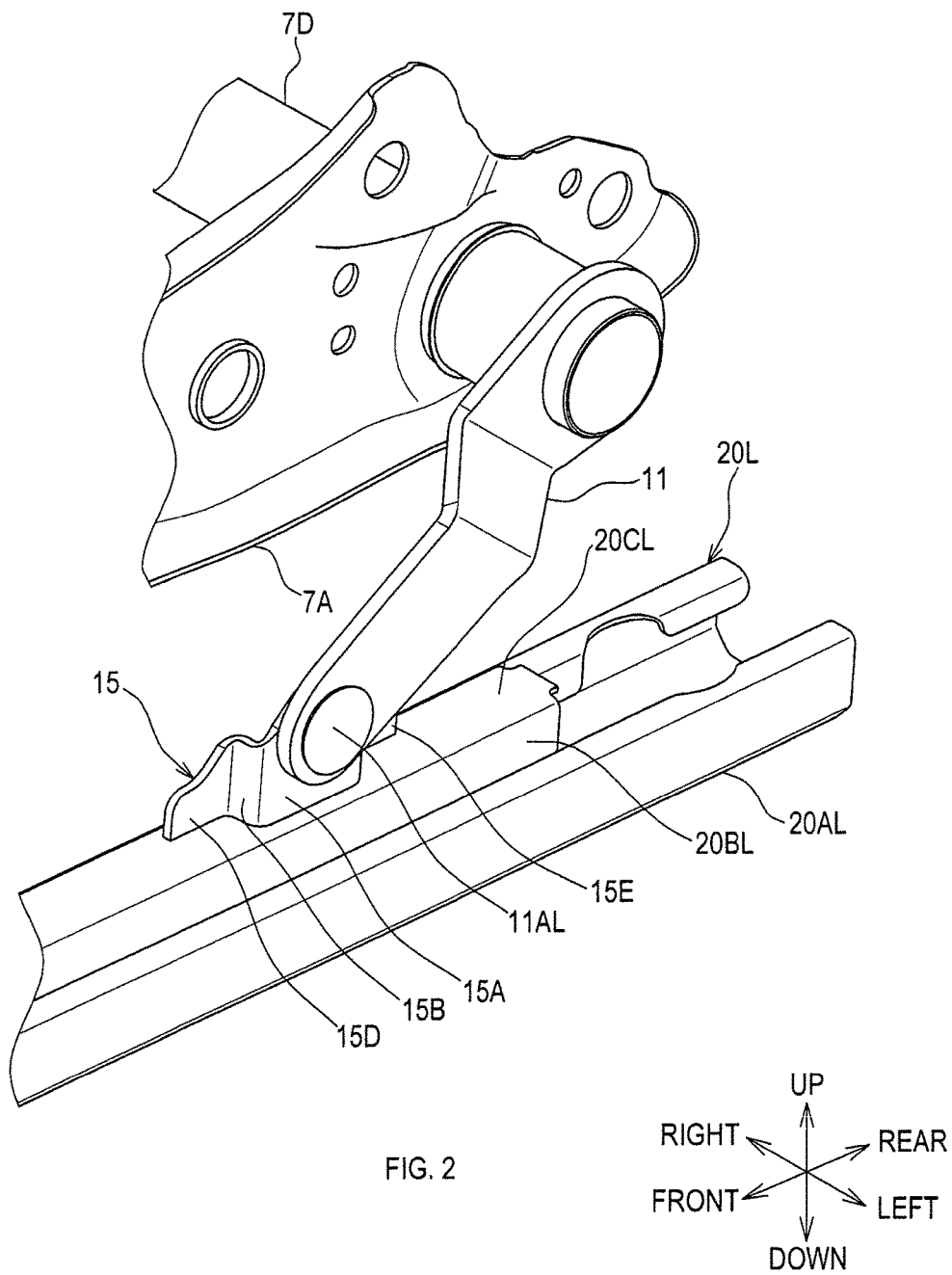
FIG. 2 is a view showing characteristics of the vehicle seat according to a first embodiment.
Figure 4:
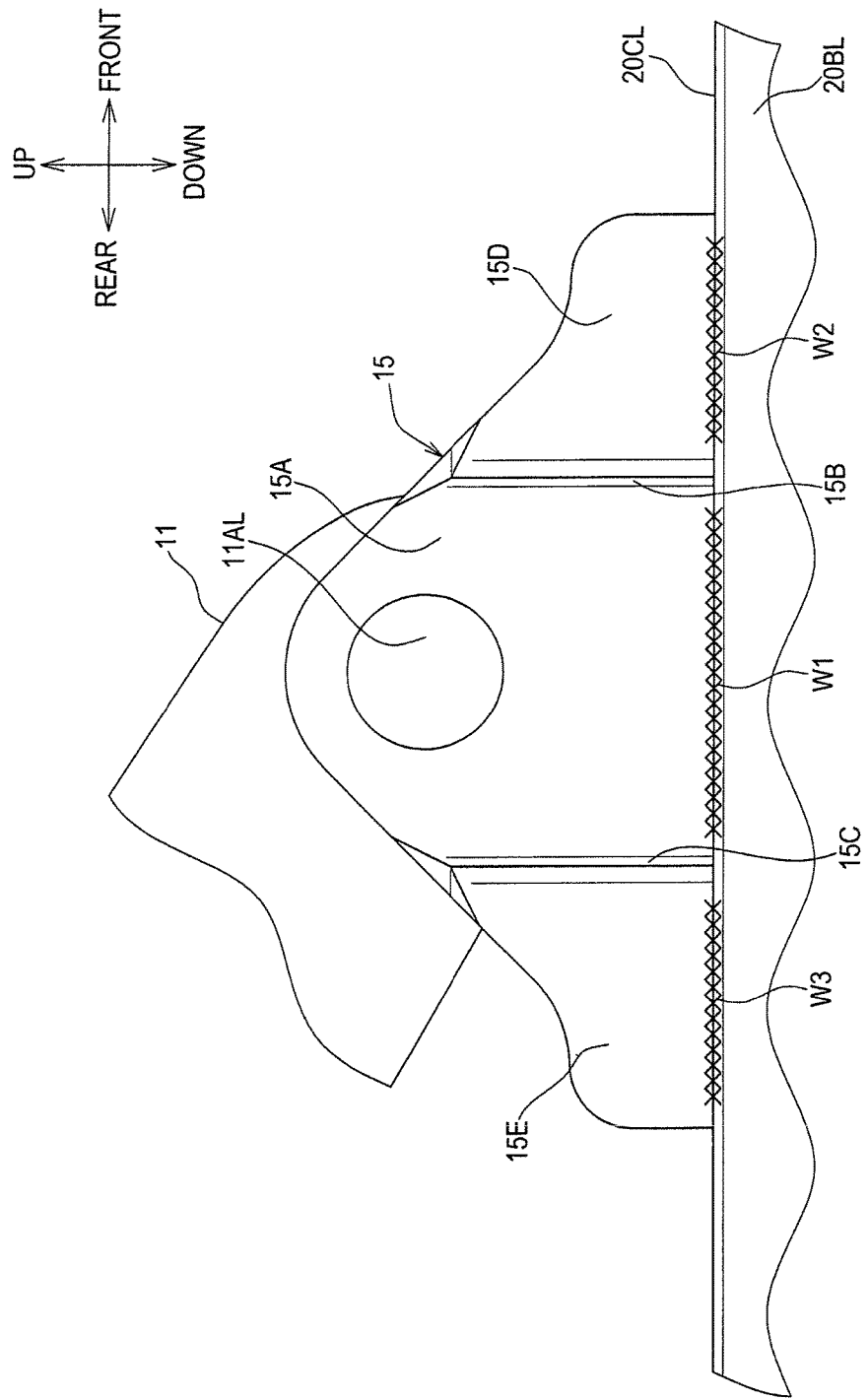
FIG. 4 is a view showing characteristics of the vehicle seat according to the first embodiment.
Figure 5:
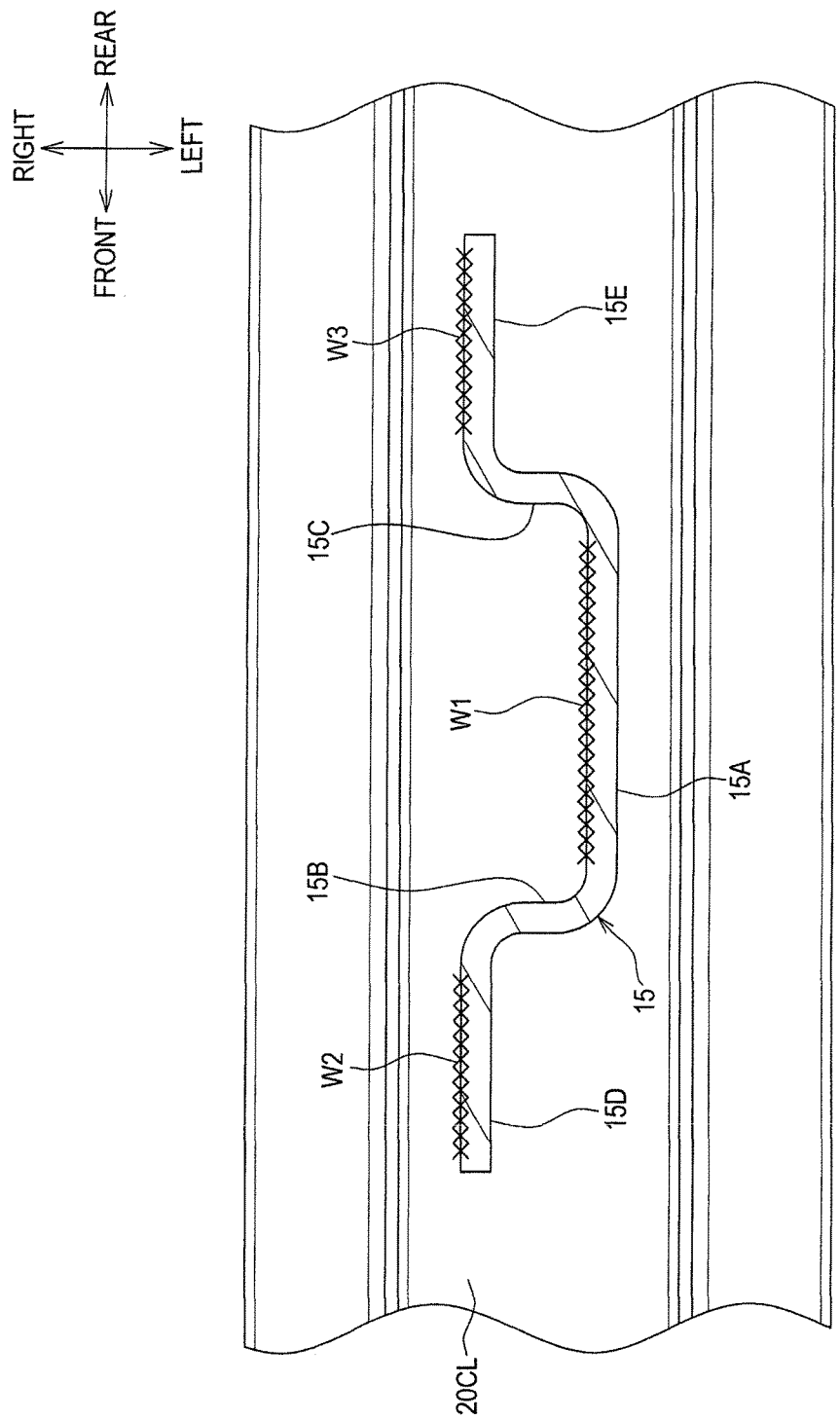
FIG. 5 is a view showing characteristics of the vehicle seat according to a second embodiment.

Hereinafter, details of the weld structure will be described by way of the left rear coupling bracket 15 shown in FIG. 2 as an example. The left rear coupling bracket 15, as shown in FIGS. 3 to 5, includes a coupling portion 15A, a first flange portion 15SB, and a second flange portion 15C.

Figure 3:
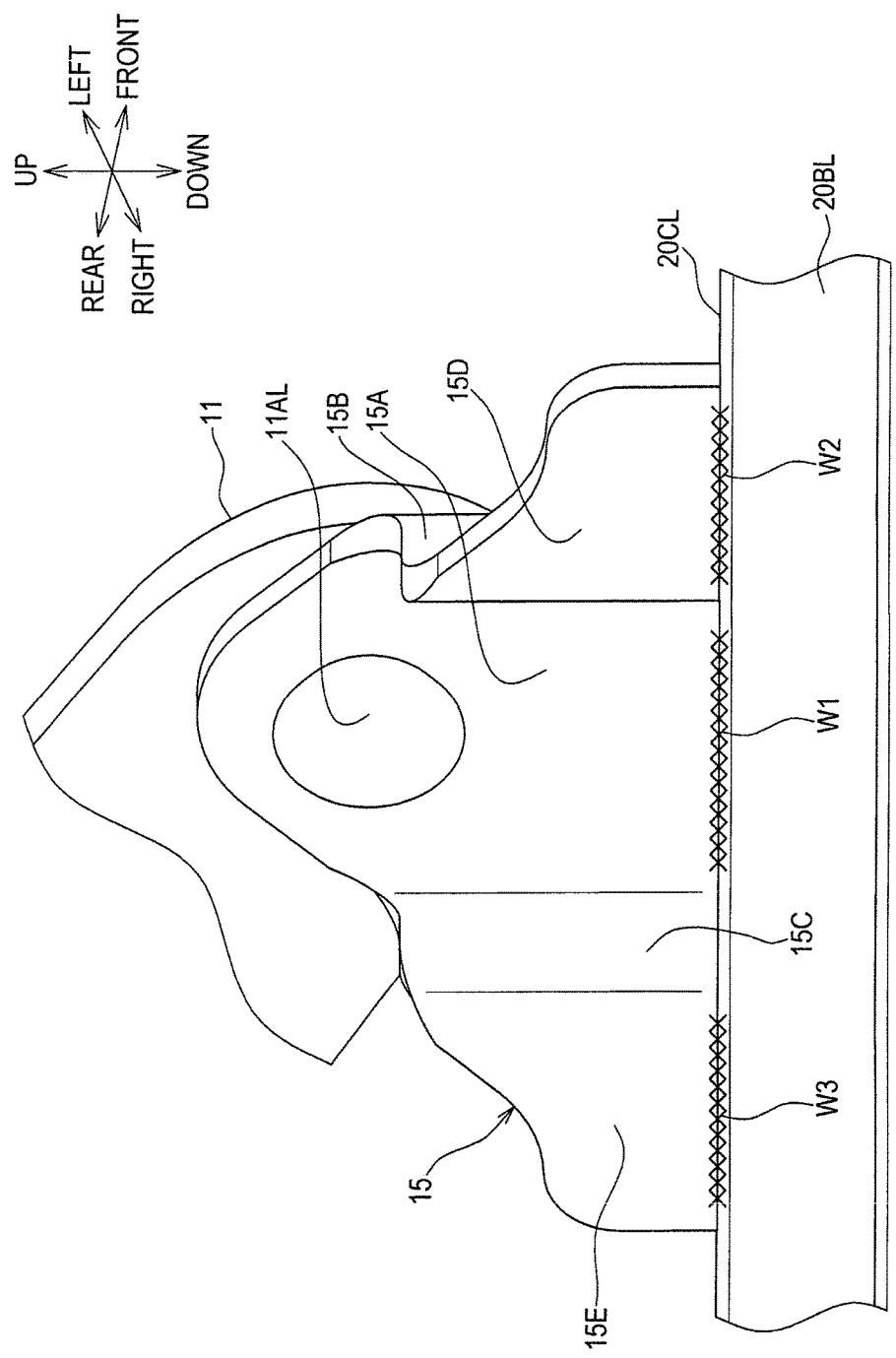
FIG. 3 is a view showing characteristics of the vehicle seat according to the first embodiment.

The coupling portion 15A is a plate-like member to which the left rear lifter link 11 is swingably coupled (see FIG. 3). The coupling portion 15A comprises a plate material that is substantially orthogonal to the fixing face 20CL (see FIG. 4) and substantially parallel to the seat front-rear direction (see FIG. 5). In other words, coupling portion 15A is a vertical plate extending in a front rear direction.

An end face of the plate material, which forms the coupling portion 15A, is laser-welded to the fixing face 20CL. In FIG. 5 and the like, a portion W1 (front welded portion W1) shown with "XXXX" is the welded portion.

The first flange portion 15B protrudes in the seat width direction (the right side of the seat in the present embodiment) from one end in the seat front-rear direction (a leading end of the seat in the present embodiment) of the coupling portion 15A, and comprises a plate material substantially orthogonal to the fixing face 20CL. In other words, first flange portion 15B is vertical plate extending in a left-right direction.

The second flange portion 15C protrudes in the seat width direction (the right side of the seat in the present embodiment) from the other end in the seat front-rear direction (a rear end of the seat in the present embodiment) of the coupling portion 15A, and comprises a plate material substantially orthogonal to the fixing face 20CL.

The first flange portion 15B, as shown in FIG. 5, is provided with a first fin portion 15D at a leading end in a protruding direction (a right end in the present embodiment) of the first flange portion 15B. The first fin portion 15D is a "fin" shaped member that protrudes in the seat front-rear direction toward an opposite side of the coupling portion 15A across the first flange portion 15B (a front side of the seat in the present embodiment).

The second flange portion 15C is provided with a second fin portion 15E at a leading end in a protruding direction (a right end in the present embodiment) of the second flange portion 15C. The second fin portion 15E is a "fin" shaped member that protrudes in the seat front-rear direction toward an opposite side of the coupling portion 15A across the second flange portion 15C (a rear side of the seat in the present embodiment).

End faces of the plate material, which form the first fin portion 15D and the second fin portion 15E, are laser-welded to the fixing face 20CL. In FIG. 5 and the like, portions W2, W3 shown with "XXXX" are the welded portions.

The coupling portion 15A, the first flange portion 15B, the second flange portion 15C, the first fin portion 15D and the second fin portion 15E are an integrally molded part produced by applying pressing (plastic working) to one piece of plate material.

That is, the first flange portion 15B and the second flange portion 15C are integrally molded with the coupling portion 15A. The first fin portion 15D is integrally molded with the first flange portion 15B. The second fin portion 15E is integrally molded with the second flange portion 15C.

Each of the welded portions W1 to W3 is welded by radiation of laser light from the left side frame 7A side, that is the cushion frame 7 side. Specifically, in the left rear coupling bracket 15, welding is performed by radiation of laser light from the right end side of the seat.

Figure 6:
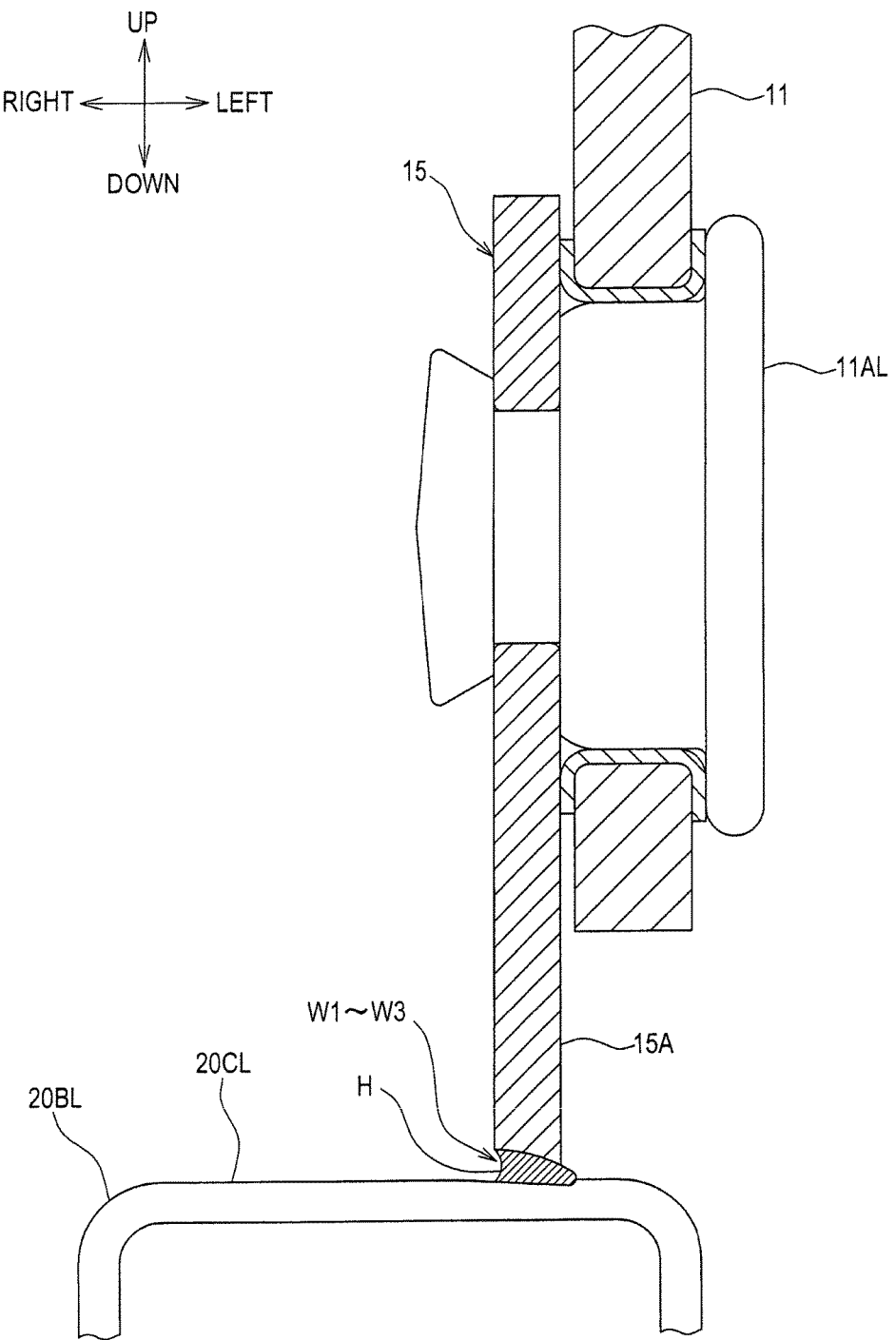
FIG. 6 is a view showing a "sink mark" of welded portions W1 to W3 according to the first embodiment.

At a portion radiated with laser light, as shown, in FIG. 6, a sink mark H is produced, which is a depression on the plate surface of the plate material. In other words, the cushion frame 7 is located at a portion displaced to the sink mark H side in the seat width direction with respect to the left rear coupling bracket 15.

3. Characteristic of Vehicle Seat of Present Embodiment

The coupling portion 15A comprises a plate material that is substantially orthogonal to the fixing face 20CL and is substantially parallel to the seat front-rear direction. An end face of the plate material is welded to the fixing face 20CL.

Each of the first flange portion 15B and the second flange portion 15C protrudes in the seat width direction from an end in the seat front-rear direction of the coupling portion 15A, comprises a plate material substantially orthogonal to the fixing face 20CL, and is integrally molded with the coupling portion 15A.

Thus, the coupling portion 15A comprising the plate material is laser-welded to the fixing face 20CL at the end face of the plate material. Therefore, a weld length in the seat width direction of the welded portion W1 between the coupling portion 15A and the fixing face 20CL is equal to or smaller than a plate thickness dimension of the coupling portion 15A.

Accordingly, if a load in a direction parallel to the plate thickness direction, that is the load in the seat width direction, is applied to the coupling portion 15A, it is possible that a large bending stress may be generated in the welded portion W.

However, since the first flange portion 15B and the second flange portion 15C protrude in the seat width direction from the ends in the seat front-rear direction of the coupling portion 15A and are integrally molded with the coupling portion 15A, the load in the seat width direction can be received by the first flange portion 15B and the second flange portion 15C.

Accordingly, even if a load in the seat width direction is applied, it is possible to inhibit a large bending stress from being generated in the welded portion W1. That is, even the coupling bracket 15 laser-welded to the fixing face 20CL can achieve sufficient weld strength.

The first flange portion 15B and the second flange portion 15C are respectively provided with the first fin portion 15D and the second fin portion 15E, which protrude toward the sides opposite to the coupling portion 15A, at the leading ends in the protruding direction of the first flange portion 15B and the second flange portion 15C.

The first fin portion 15D is integrally molded with the first flange portion 15B, and the second fin portion 15E is integrally molded with the second flange portion 15C. Each of the first fin portion 15D and the second fin portion 15E comprises a plate material substantially orthogonal to the fixing face 20CL. The end face of the plate material is welded to the fixing lace 20CL.

This allows the left rear coupling bracket 15 to be firmly welded to the fixing face 20CL, and laser light to be radiated from the same side. Thus, it is possible to improve laser welding performance.

If the cushion frame 7 is displaced in the seat width direction with respect to the left rear coupling bracket 15, a load toward the cushion frame 7 is likely to be generated in the left rear coupling bracket 15.

Laser welding produces the sink mark H, which is depression on the plate surface, in the welded portions W1 to W3 between the left rear coupling bracket 15 and the fixing face 20CL. When a "tensile (bending) stress" is applied to the sink mark, cracks starting from the sink mark H are likely to be generated.

However, if the cushion frame 7 is displaced to the sink mark H side with respect to the coupling bracket 15, a "tensile (bending) stress" is only slightly applied to the sink mark H. Accordingly, the present configuration can inhibit generation of cracks starting from the sink mark H.

If a load toward the cushion frame 7 is generated in the above-described configuration, a "compression (bending) stress" is applied to the sink mark H. Therefore, cracks starting from the sink mark H are hardly generated.

Second Embodiment

The first flange portion 15B and the second flange portion 15C according to the above-described first embodiment protrude toward the right side of the seat (one end in the seat width direction) from the coupling portion 15A, and the left rear litter link 11 coupled to the left side of the seat (the other end in the seat width direction) of the coupling portion 15A.

Figure 7:
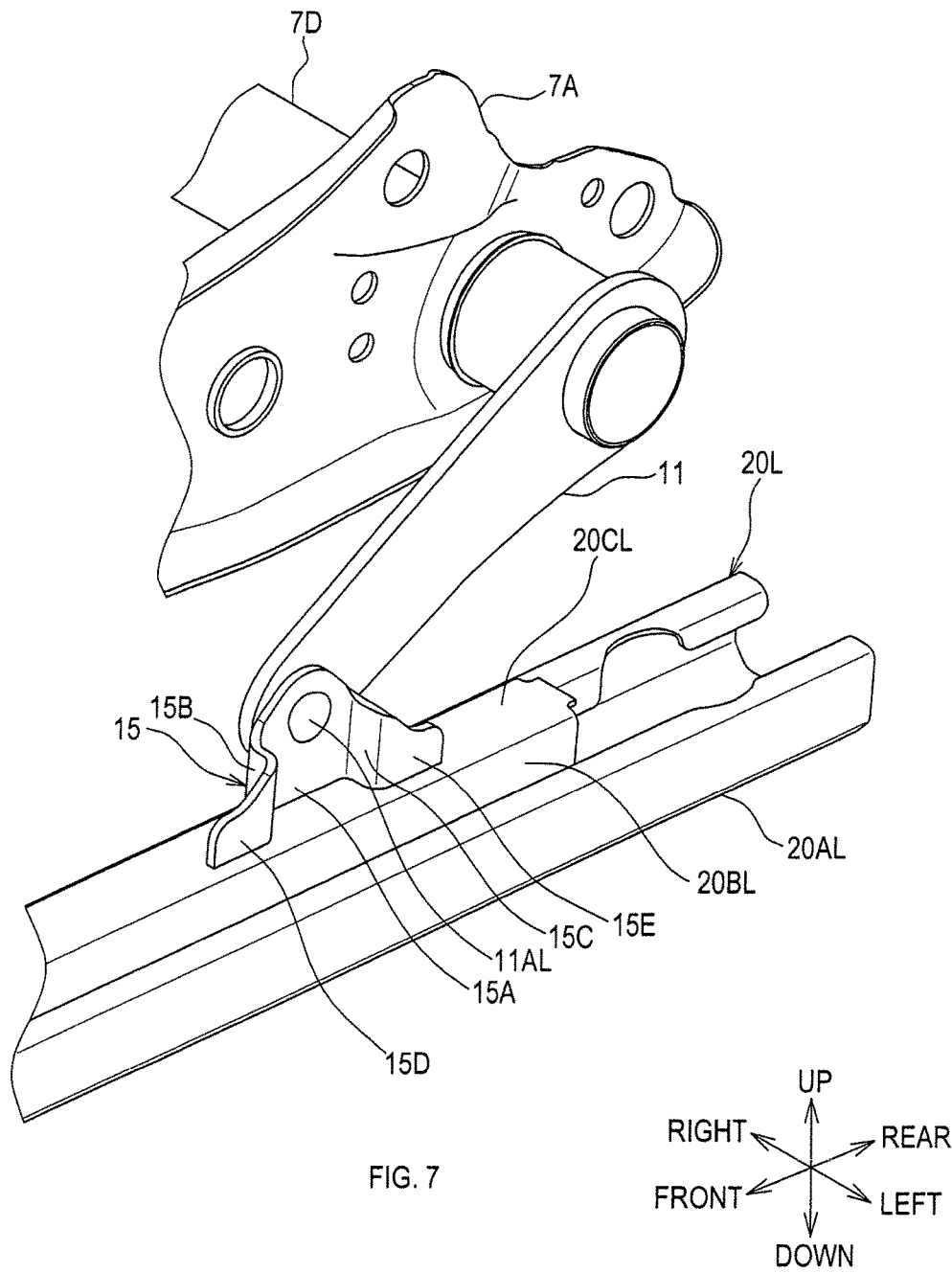
FIG. 7 is a view showing characteristics of the vehicle seat according to the second embodiment.
Figure 8:
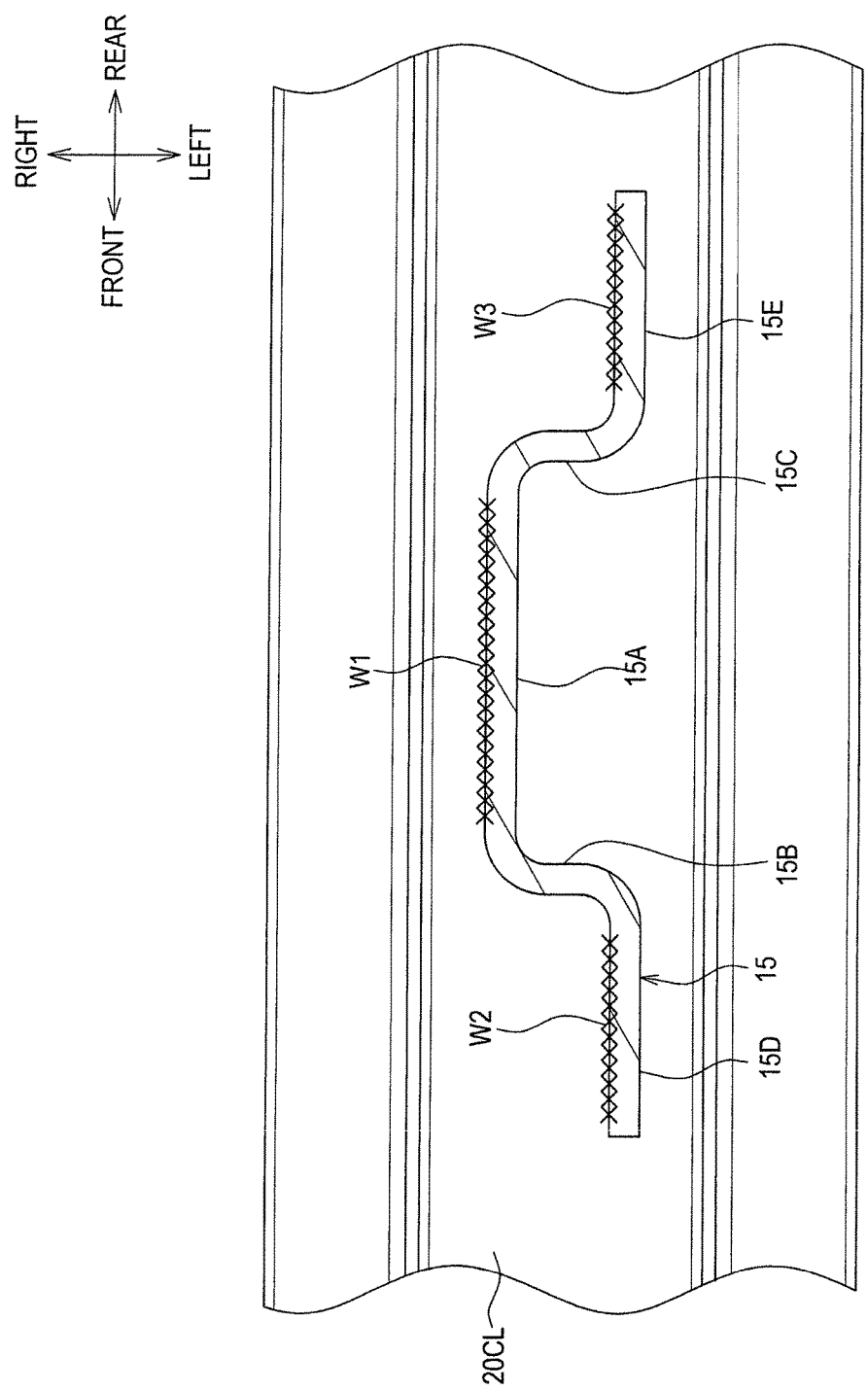
FIG. 8 is a view showing characteristics of the vehicle seat according to second embodiment.

In contrast, the first flange portion 15B and the second flange portion 15C according to the present second embodiment, as shown in FIGS. 7 and 8, protrude toward the left side in the seat width direction (the other end in the seat width direction) from the coupling portion 15A.

The left rear lifter link 11 is located opposite to the first flange portion 15B and the second flange portion 15C across the coupling portion 15A. This is to avoid the left rear lifter link 11 from interfering with the first flange portion 15B and the second flange portion 15C when the left rear lifter link 11 swings.

Accordingly, in the second embodiment, the left rear lifter link 11 is coupled to the right side in the seat width direction (one end in the seat width direction) of the coupling portion 15A. The same reference numbers as in the above-described first embodiment are given to the same components. Thus, the description thereof is not repeated.

Other Embodiments

In the above-described embodiments, the coupling portion 15A is laser-welded to the fixing face 20CL, and the first flange portion 15B and the second flange portion 15C are not welded to the fixing face 20CL. However, the present disclosure is not limited to this.

For example, the first flange portion 15B and the second flange portion 15C may be laser-welded to the fixing face 20CL, or at least one of the coupling portion 15A, the first flange portion 15B, the second flange portion 15C, the first fin portion 15D, and the second fin portion 15E may be laser-welded to the fixing face 20CL.

In the above-described embodiments, two flange portions, that is the first flange portion 15B and the second flange portion 15C, are provided. However, the present disclosure is not limited to this. For example, only one of the first flange portion 15B and the second flange portion 15C may be provided.

In the above-described embodiments, two fin portions, that is the first fin portion 15D and second fin portion 15E, are provided. However, the present disclosure is not limited to this. For example, the first fin portion 15D and the second fin portion 15E may not be provided, or only one of the first fin portion 15D and the second fin portion 15E may be provided.

In the above-described embodiments, the first flange portion 15B and the second flange portion 15C protrude in the same direction. However, the present disclosure is not limited to this. For example, the protruding direction of the first flange portion 15B may be different from the protruding direction of the second flange portion 15C.

The cushion frame 7 according to the above-described embodiments is displaced to the sink mark H side in the seat width direction with respect to the coupling bracket 15. However, the present disclosure is not limited to this.

In the above-described embodiments, the left rear coupling bracket 15 has been described as an example. However, the present disclosure is not limited to this. The present disclosure can be applied to other coupling brackets 13, 14, 16. Note that the left front coupling bracket 13 and the right front coupling bracket 14 according to the above-described embodiments are not provided with portions corresponding to the second flange portion 15C and the second fin portion 15E (see FIG. 1).

In the above-described embodiments, an example of a vehicle seat has been described. However, the present disclosure is not limited to this. The present disclosure can be also applied to a seat for use in a vehicle such as railway vehicles, ships, and aircrafts, as well as to a stationary type seat for use such as in theatres and at home.

Furthermore, the present disclosure is not limited to the above-described embodiments as long as the present disclosure meets the gist of the invention recited in the claims. Thus, at least two embodiments among the plurality of embodiments described above may be combined.

What is claimed is:

1. A vehicle seat to be mounted on a vehicle, the vehicle seat comprising:
   a cushion frame forming a frame of a cushion seat;
   a coupling bracket disposed spaced downward from the cushion frame and comprising a plate material, the coupling bracket including a coupling portion and a flange portion;
   a lifter link configured to swing in a seat front-rear direction so as to vertically displace the cushion frame, an upper end of the lifter link being swingably coupled to the cushion frame, and a lower end of the lifter link being swingably coupled to the coupling portion; and
   a fixing member having a fixing face to which an end face of the coupling portion is welded, the fixing member being fixed, directly or indirectly, to the vehicle,
   the coupling portion including a plate material substantially orthogonal to the fixing face and substantially parallel to the seat front-rear direction, the end face of the coupling portion being welded to the fixing face,
   the flange portion comprising a plate material substantially orthogonal to the fixing face and protruding in a seat width direction from one end in the seat front-rear direction of the coupling portion, and the flange portion being integrally molded with the coupling portion.

2. The vehicle seat according to claim 1, wherein
   a fin portion is provided at a leading end in a protruding direction of the flange portion, the fin portion protruding in the seat front-rear direction,
   the fin portion is integrally molded with the flange portion and comprises a plate material substantially orthogonal to the fixing face, and an end face of the fin portion is welded to the fixing face.

3. The vehicle seat according to claim 2, wherein
   when the flange portion is a first flange portion and the fin portion is a first fin portion, a second flange portion and a second fin portion are provided at a second end in the seat front-rear direction of the coupling portion, the second flange portion protrudes in the seat width direction from the second end in the seat front-rear direction of the coupling portion, includes a plate material substantially orthogonal to the fixing face, and is integrally molded with the coupling portion, the second fin portion is integrally molded with the second flange portion, comprises a plate material substantially orthogonal to the fixing face, and an end face of the second fin portion is welded to the fixing face.

4. The vehicle seat according to claim 3, wherein the first flange portion and the second flange portion protrude in the same direction in the seat width direction.

5. The vehicle seat according to claim 1, further comprising:

a welded portion joining the coupling bracket to the fixing face, wherein an interior surface of the welded portion is concave.

6. The vehicle seat according to claim 1, wherein the cushion frame includes a first side frame and a second side frame, the first side frame being coupled to the second side frame via a coupling rod, the upper end of the lifter link is swingably coupled to the first side frame, and the flange portion protrudes in the seat width direction toward the second side frame.

7. The vehicle seat according to claim 1, wherein the cushion frame includes a first side frame and a second side frame, the first side frame being coupled to the second side frame via a coupling rod, the upper end of the lifter link is swingably coupled to the first side frame, and the flange portion protrudes in the seat width direction away from the second side frame.

* * * * *